United States Patent
Hayakawa et al.

(10) Patent No.: US 8,706,352 B2
(45) Date of Patent: Apr. 22, 2014

(54) VEHICLE DRIVING SUPPORT SYSTEM AND VEHICLE DRIVING SUPPORT METHOD

(75) Inventors: Yasuhisa Hayakawa, Yokohama (JP); Kou Satou, Atsugi (JP); Masahiro Kobayashi, Ebina (JP); Hidekazu Nakajima, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 417 days.

(21) Appl. No.: 12/816,019

(22) Filed: Jun. 15, 2010

(65) Prior Publication Data

US 2010/0318263 A1   Dec. 16, 2010

(30) Foreign Application Priority Data

Jun. 16, 2009   (JP) .................... 2009-143025

(51) Int. Cl.
*B62D 6/00* (2006.01)
*G05D 1/00* (2006.01)
*G06F 7/00* (2006.01)
*G08G 1/16* (2006.01)

(52) U.S. Cl.
USPC ............. 701/41; 701/36; 701/300; 701/301; 340/435

(58) Field of Classification Search
USPC ............... 701/36, 41, 42, 70, 201, 300, 301; 340/435
See application file for complete search history.

(56) References Cited

U.S. PATENT DOCUMENTS

| | | | |
|---|---|---|---|
| 7,107,137 B2* | 9/2006 | Tange et al. | 701/70 |
| 7,634,339 B2* | 12/2009 | Kudo | 701/41 |
| 2003/0045982 A1* | 3/2003 | Kondo et al. | 701/41 |
| 2004/0186650 A1* | 9/2004 | Tange et al. | 701/96 |
| 2007/0100551 A1* | 5/2007 | Ishikura | 701/301 |
| 2008/0172153 A1* | 7/2008 | Ozaki et al. | 701/36 |
| 2009/0088966 A1* | 4/2009 | Yokoyama et al. | 701/201 |
| 2010/0030430 A1* | 2/2010 | Hayakawa et al. | 701/42 |

FOREIGN PATENT DOCUMENTS

| | | |
|---|---|---|
| JP | 2005-041459 | 2/2005 |
| JP | 2005-125933 | 5/2005 |

\* cited by examiner

*Primary Examiner* — Fadey Jabr
*Assistant Examiner* — Thomas Ingram
(74) *Attorney, Agent, or Firm* — Young Basile

(57) ABSTRACT

When an obstacle is sensed on a side of a vehicle, the future position of the vehicle after a prescribed time is predicted. When the predicted vehicle future position reaches a prescribed lateral position in the lane width direction, a decision to start a control is made, and the vehicle is controlled in a direction to prevent it from coming too close to the obstacle. If a state occurs in which the obstacle is sensed after not being sensed (i.e., it is first sensed), a decision to start the control is suppressed.

16 Claims, 13 Drawing Sheets

VEHICLE DRIVING SUPPORT SYSTEM AND VEHICLE DRIVING SUPPORT METHOD

CROSS-REFERENCE TO RELATED APPLICATION

This application claims priority to Japanese Patent Application Serial No. 2009-143025, filed Jun. 16, 2009, which is incorporated herein in its entirety by reference.

TECHNICAL FIELD

The present invention relates to a vehicle driving support system and to a vehicle driving support method that prevent the vehicle getting too close to an obstacle when an obstacle is detected near the vehicle.

BACKGROUND

An example of a conventional vehicle driving support device includes the technology described in Japanese Kokai Patent Application No. 2005-41459. With that technology, when an obstacle is detected on one of the sides of a vehicle, if the distance from a lane dividing line to the vehicle is less than a prescribed distance, a yaw moment is produced so that the distance from the lane dividing line to the vehicle will be changed so that it equals at least the prescribed distance. Thus the distance between the obstacle and the vehicle is prevented from becoming smaller than the prescribed distance.

BRIEF SUMMARY

With the technology described in Japanese Kokai Patent Application No. 2005-41459, however, if a driver intentionally drives the vehicle near a lane dividing line and another vehicle in an adjacent lane attempts to pass the vehicle, this activates the control to stop the vehicle from coming too close to the other vehicle. This generates unanticipated yaw moments in the vehicle, which could make the driver feel uneasy.

Embodiments of the present invention, in contrast, provide a vehicle driving support device and a vehicle driving support method that perform appropriate support control for side obstacles while reducing the driver's sense of uneasiness.

For example, when an obstacle is detected on one of the sides of the vehicle, one embodiment of the present invention predicts the future position of the vehicle after a preset prescribed time and controls the vehicle to apply a yaw moment to the vehicle in a direction to prevent the vehicle from coming too close to the obstacle when the predicted future position of the vehicle is closer to the obstacle in the lane width direction than a control start position that is a preset prescribed lateral position in the lane width direction. In this instance, the control to impart the yaw moment to the vehicle is suppressed when a state occurs in which an obstacle is sensed after not being sensed and when the vehicle travel position is closer to the obstacle in the lane width direction than a preset predetermined prescribed lateral position between the center position in the travel lane where the vehicle is traveling and the control start position.

As described above, the control to impart a yaw moment in a direction to prevent the vehicle from coming too close to an obstacle is adjusted according to the position of the vehicle when a state occurs in which an obstacle is sensed after not being sensed. Specifically, when the vehicle is intentionally traveling toward an obstacle when the obstacle has not been detected, the control is suppressed even when the obstacle is detected. The result is that driver uneasiness can be reduced.

Details of this embodiment and others are described hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the following embodiments, a vehicle driving support device is explained as mounted in a rear-wheel drive vehicle. Note that a front-wheel drive vehicle or an all-wheel drive vehicle could also be used as the subject vehicle.

First Embodiment

Figure 1:
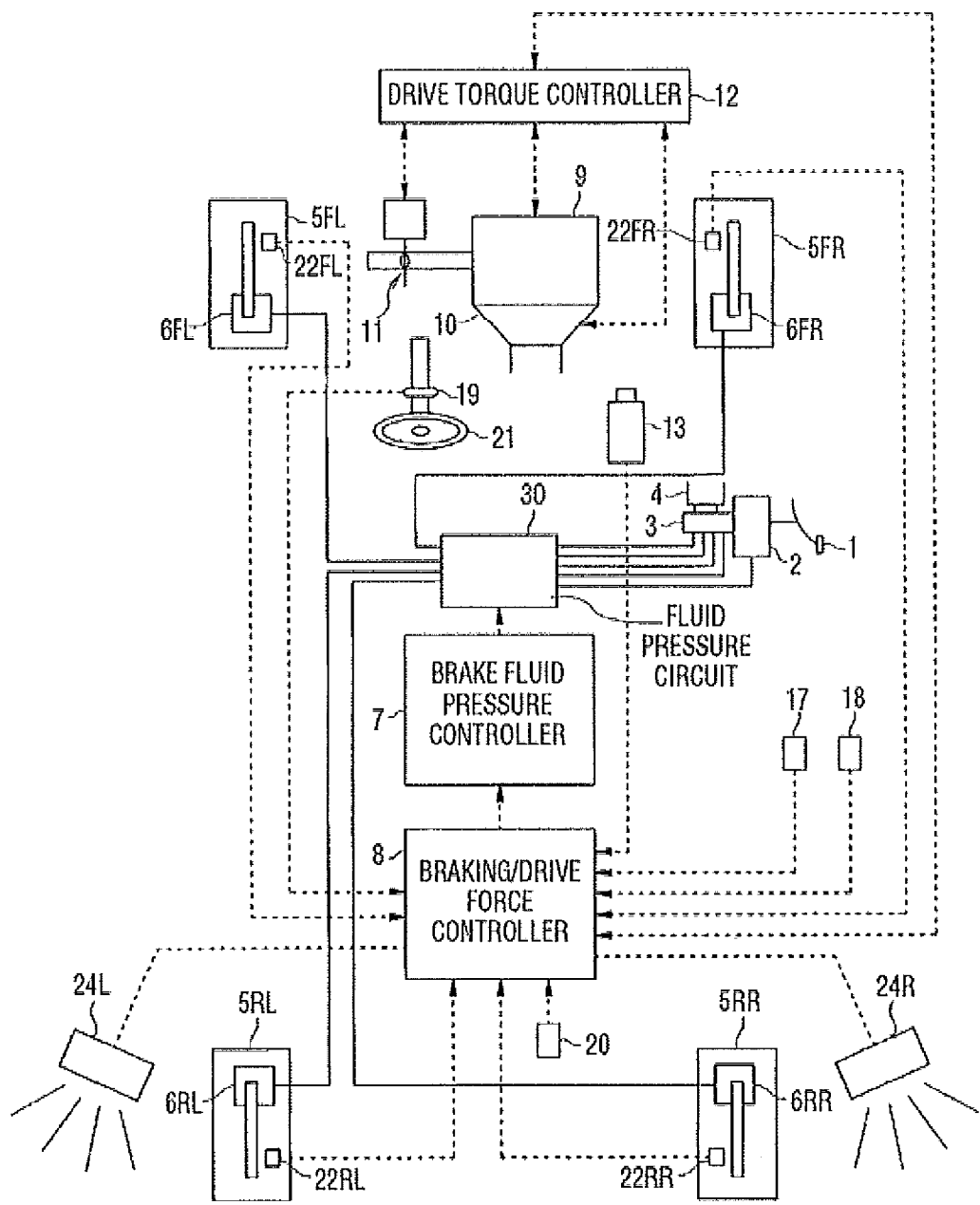
FIG. 1 is a schematic diagram illustrating an embodiment of the present invention.

FIG. 1 is a schematic diagram of a vehicle driving support device pertaining to a first embodiment.

A brake pedal 1 is connected to a master cylinder 3 through a booster 2. The master cylinder 3 is connected to individual wheel cylinders 6FL-6RR of the individual wheels through a pressurized fluid circuit 30, which is supplied with fluid from a reservoir 4. In this way, when brake control is not active, the master cylinder 3 increases the brake fluid pressure according to the amount that the brake pedal 1 is depressed by the driver. The raised brake fluid pressure is supplied to individual wheel cylinders 6FL-6RR of individual wheels 5FL-5RR through pressurized fluid circuit 30.

A brake fluid pressure controller 7 controls an actuator in the pressurized fluid circuit 30 and controls the brake fluid pressure to each wheel cylinder 6FL-6RR separately. The brake fluid pressure to each wheel cylinder 6FL-6RR is regulated to a corresponding desired value from a braking/drive force controller 8. The actuator is a proportional solenoid that can regulate the fluid pressure of each wheel cylinder 6FL-6RR to any brake fluid pressure.

Here, for brake fluid pressure controller 7 and pressurized fluid circuit 30, a brake fluid pressure controller used with an anti-lock brake system (ABS), traction control system (TCS) or vehicle dynamic control system (VDC) may be used. Brake fluid pressure controller 7 can also be configured to control the brake fluid pressure for each wheel cylinder 6FL-6RR independently. Then when a desired brake fluid pressure value is input from braking/drive force controller 8, described below, the individual brake fluid pressures are controlled according to the desired brake fluid pressure values.

A drive torque controller 12 is also provided for the vehicle. The drive torque controller 12 controls the drive torque to the rear wheels 5RL and 5RR, which are the drive wheels. This control is realized by controlling the operating state of the engine 9, the selected gear ratio for the automatic transmission 10, and the throttle opening of throttle valve 11. That is, the drive torque controller 12 controls the fuel injection quantity and/or the ignition timing. It also simultaneously controls the throttle opening. This method controls the operating state of engine 9.

The drive torque controller 12 outputs a value for drive torque Tw, which is information for the control, to braking/drive force controller 8 (vehicle control means).

Note that the drive torque controller 12 can also control the drive torque for the rear wheels 5RL and 5RR independently. When a desired drive torque value is input from braking/drive controller 8, the drive wheel torque is controlled according to the desired drive torque value.

An imaging unit with imaging processing functions 13 is also provided at the front of the vehicle. The imaging unit 13 is used to sense the position of the vehicle in a travel lane. The imaging unit 13 is configured, for example, with a monocular camera composed of a CCD (Charge Coupled Device) camera. The imaging unit is a lane detection device that detects the lane characteristics, including the lane dividing line, curvature, etc.

The imaging unit 13 photographs the area in front of the vehicle. Then the imaging unit 13 performs image processing for the image photographed in front of the vehicle, senses the lane dividing lines (lane markers), and senses the travel lane based on the lines that are sensed.

In addition, the imaging unit 13 calculates an angle (yaw angle) $\phi_{front}$ formed by the vehicle's travel lane and the vehicle's front to back axis, lateral displacement $X_{front}$ relative to the travel lane and travel lane curvature $\beta_{front}$ based on the sensed travel lane. Imaging unit 13 outputs the calculated yaw angle $\phi_{front}$, lateral displacement $X_{front}$ and travel lane curvature $\beta_{front}$ to braking/drive controller 8.

Here, the imaging unit 13 senses the white lines that form a travel lane and calculates yaw angle $\phi_{front}$ based on the white lines that are sensed. For this reason, yaw angle $\phi_{front}$ significantly affects the white line sensing precision by imaging unit 13.

Note that the travel lane curvature $\beta_{front}$ can also be calculated based on the steering angle $\delta$ of steering wheel 21, described below.

The vehicle is also provided with radar devices 24L/R. Radar devices 24L/R are sensors for sensing obstacles on the left and right sides, respectively, of the vehicle. Radar devices 24 L/R are, for example, milliwave radars that emit an electromagnetic wave at least toward prescribed blind spot areas (ranges) alongside the vehicle and that can sense the presence of an obstacle in the prescribed blind spot areas (ranges) by sensing the reflected wave in relation to the emitted electromagnetic wave. Hereafter they will be called simply milliwave radars. Radar devices 24L/R can preferably sense the relative lateral position $POSX_{obst}$, the relative longitudinal position $DIST_{obst}$ and the relative longitudinal speed $dDIST_{obst}$ of an obstacle on the left and right, respectively. Note that here, the lateral direction in the embodiments in this specification means the lane width direction, and the longitudinal direction means the lane continuation direction.

The vehicle is also provided with a master cylinder pressure sensor 17, an accelerator opening sensor 18, a steering angle sensor 19, a direction indicating switch 20 and wheel speed sensors 22FL-22RR.

The master cylinder pressure sensor 17 senses the output pressure from the master cylinder 3, that is, the master cylinder fluid pressure Pm. Accelerator opening sensor 18 senses the amount that the accelerator pedal is depressed, that is, the accelerator angle $\theta t$. The steering angle sensor 19 senses the steering angle (steering guide angle) $\delta$ of steering wheel 21. The direction indicating switch 20 senses the direction indicating operation using a direction indicator. The wheel speed sensors 22FL-22RR sense the rotational speed of each wheel 5FL-5RR, or so-called wheel speed Vwi (i=fl, fr, rl, rr). The sensors then output the sensed signals to the braking/drive force controller 8.

Figure 2:
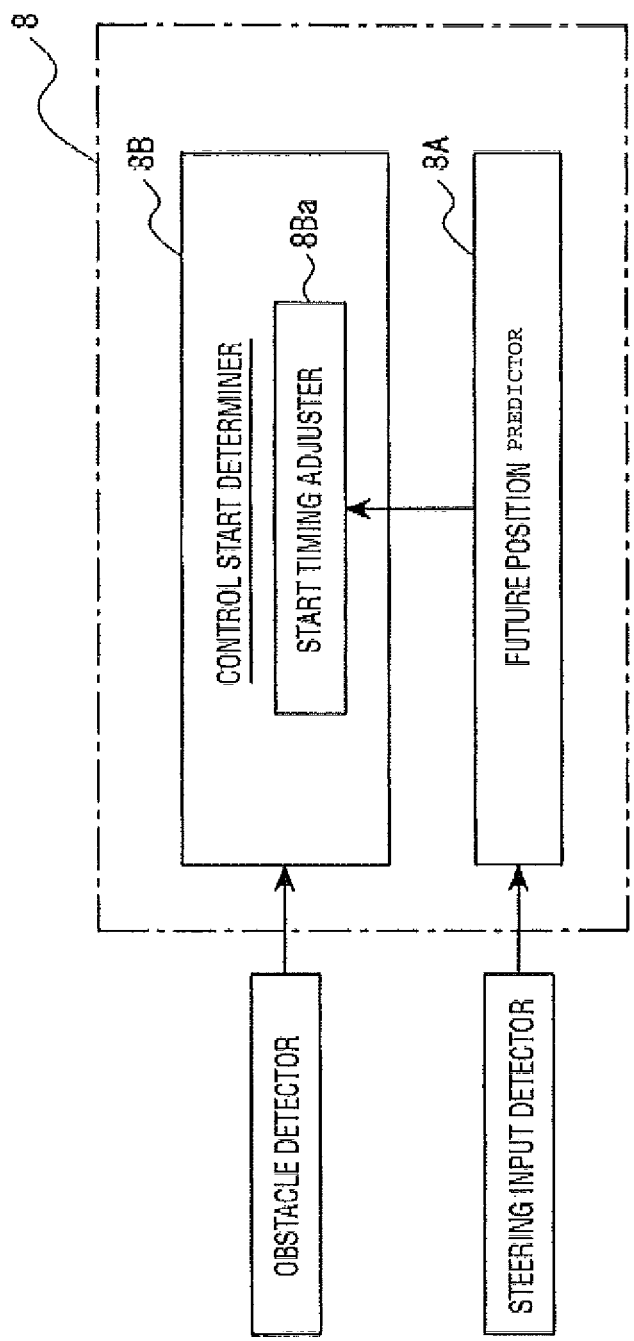
FIG. 2 is a block diagram illustrating the configuration of a controller.

FIG. 2 is a block diagram showing the configuration of braking/drive force controller 8.

As shown in FIG. 2, the braking/drive force controller 8 (vehicle control means) is provided with a future position predictor 8A and a control start determiner 8B. The control start determiner 8B is also provided with a start timing adjuster 8Ba. Controller 8 and the other controllers described herein, generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the controller 8 described herein such as future position predictor 8A and control start determiner 8B, could be, for example, implemented in software as the executable programs, or could be implemented in whole or in part by separate hardware in the form of one or more integrated circuits (IC). Controller 8 can be an engine control unit (ECU) as known in the art programmed as described herein. Other controllers described herein can be similarly structured. Also, although multiple controllers are shown, fewer or more are possible.

The future position predictor 8A predicts the future position of the vehicle after the forward fixed time Tt (=headway time) has elapsed based on the driver steering input sensed by a steering input sensing means.

The control start determiner 8B decides whether to start the control after an obstacle is sensed on one side of the vehicle by determining whether the future position of the vehicle (future lateral position) will reach a control start position, which is a prescribed position in the vehicle lateral direction, or will be positioned closer to the obstacle than the control start position. In the event an obstacle becomes sensed after a cycle when an obstacle was not sensed, the control start determiner (decision device) 8B will delay the decision to start the control if the current position of the vehicle is closer to the obstacle side of the lane than the center of the lane, or if the vehicle is traveling away from the obstacle. More specifically, the start timing adjuster 8Ba suppresses a decision to start the control by comparing when the travel position of the vehicle in the lane width direction is closer to one side of the lane than the center of the travel lane in which the vehicle is traveling and is traveling toward an obstacle from a predetermined prescribed lateral position at the center of the travel lane and when the vehicle is traveling to the opposite side from the obstacle in relation to the prescribed lateral position. These conditions make the decision to start the control less likely.

The braking/drive force controller 8 calculates a yaw moment Ms to control the vehicle in order to prevent it from coming too close to an obstacle when the control start determiner 8B senses a control start.

Figure 3:
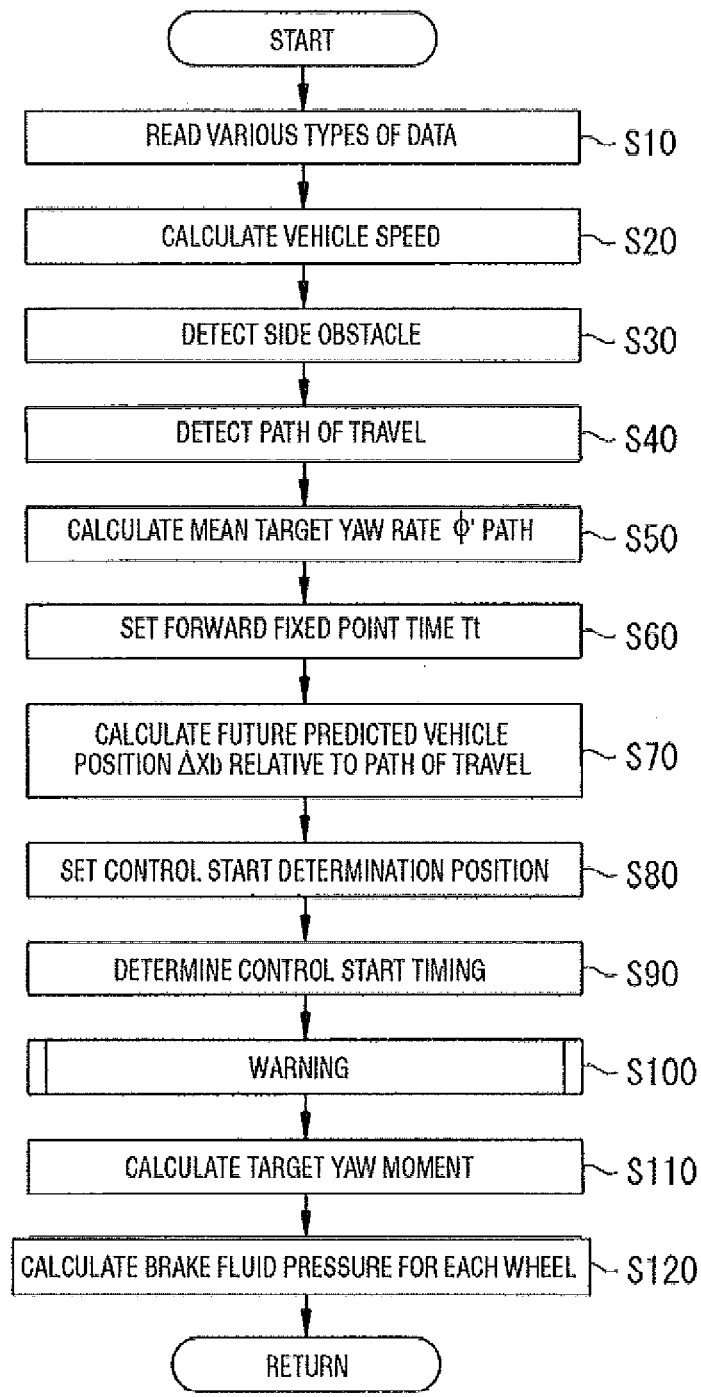
FIG. 3 is a flowchart showing the processing procedure by the controller in a first embodiment.

FIG. 3 is a flowchart showing the obstacle avoidance control processing procedure executed by braking/drive force controller 8.

The obstacle avoidance control processing is executed with timer interrupts at a prescribed sampling time ΔT interval (every 10 msec, for example). Note that in the processing shown in FIG. 3, although no communication processing is provided, the calculated information can be updated and stored in a storage device at any time, and the required information can also be read from the storage device at any time.

First, at step S10, the braking/drive force controller 8 reads various types of data from each of the sensors, controllers or control devices. Specifically, it acquires the individual wheel speeds Vwi, steering angle δ, master cylinder fluid pressure Pm and a direction switch signal.

Next, at step S20, the braking/drive force controller 8 calculates the vehicle velocity V. That is, the vehicle velocity V is calculated based on wheel speeds Vwi as in the formulas below:

$$V=(Vwrl+Vwrr)/2(\text{: with front-wheel drive}); \text{ or}$$

$$V=(Vwfl+Vwfr)/2(\text{: with rear-wheel drive}). \quad (1)$$

Here, Vwfl and Vwfr are the wheel speeds of the left and right front wheels, respectively. Vwrl and Vwrr are the wheel speeds of the left and right rear wheels, respectively. That is, with formula (1) above, the vehicle velocity V is calculated as the average value of the wheel speed of the passive, or follower, wheels. Note that with this embodiment, the vehicle is a rear-wheel drive vehicle, so that the vehicle velocity V is calculated using the latter formula, that is, with the wheel speeds of the front wheels.

When another braking control device is active, such as the control system of an ABS (Anti-lock Brake System), the vehicle body velocity that is estimated by the other braking control device is acquired and used as the vehicle velocity V.

At step S30, the braking/drive controller 8 acquires whether or not an obstacle SM is present on the left and/or right sides of the vehicle MM based on signals from the left and right radar devices 24L/R. Note that when sensors with higher sensing precision are used, the position and the speed of the side obstacle SM relative to the vehicle MM are also acquired. When describing the area monitored herein, as shown in FIG. 4, the area on the "side" of vehicle MM also includes positions behind and diagonal to vehicle MM unless otherwise stated.

Figure 4:
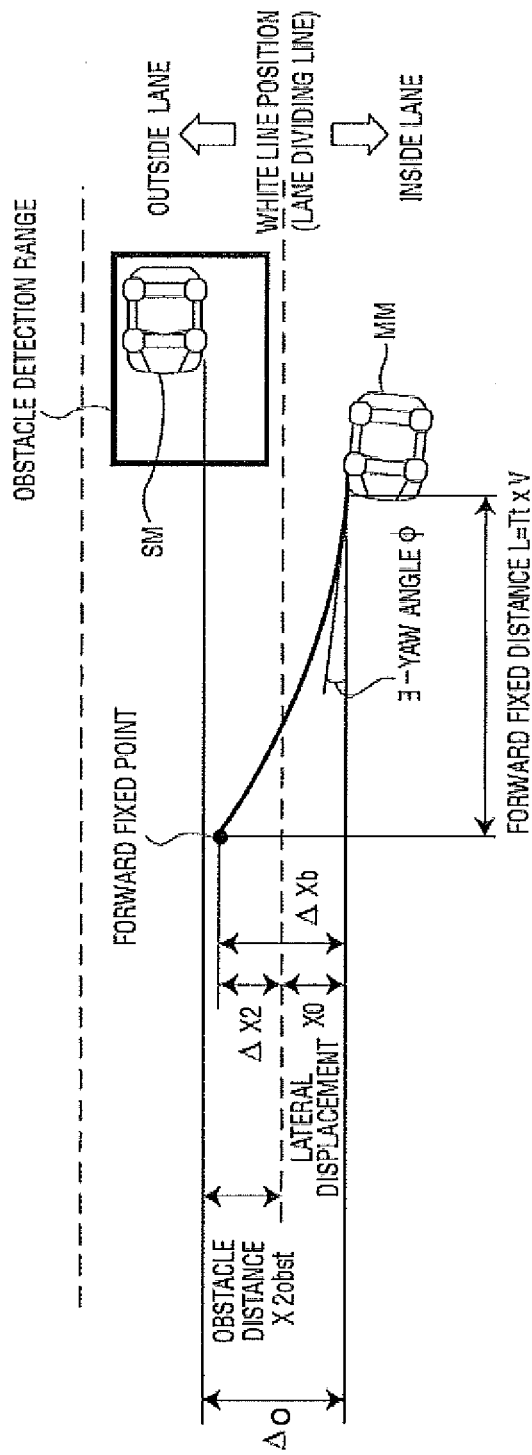
FIG. 4 is a pictorial representation of a vehicle having an inventive driving support system, showing the relationship between the vehicle and an obstacle.

The obstacle sensing range shown in FIG. 4 includes prescribed longitudinal and lateral positions on the sides of vehicle MM. Concerning the longitudinal positions, these may also be set so that the obstacle sensing range becomes wider the larger the relative speed of an obstacle SM that is approaching vehicle MM.

Next, at step S40, the braking/drive controller 8 reads the lateral displacement (lateral position) $X_{front}$ and the travel lane curvature $\beta_{front}$ of vehicle MM in the travel path currently being traveled from the imaging unit 13.

The acquisition of travel lane curvature $\beta_{front}$, however, is not limited to using imaging unit 13. Travel lane curvature $\beta_{front}$ could also be acquired, for example, using curvature information recorded in a navigation system for the vehicle position.

Yaw angle $\phi_{front}$ of vehicle MM relative to the travel path currently being traveled is also calculated. Yaw angle $\phi_{front}$ is used to sense travel conditions in the lane.

With this embodiment, an actual value measured by imaging unit 13 is used for yaw angle $\phi_{front}$.

Note that yaw angle $\phi_{front}$ could also be calculated based on a nearby lane divider line (a white line in FIG. 4) photographed by imaging unit 13, in lieu of using an actual value measured by imaging unit 13. In this case, yaw angle $\phi_{front}$ is calculated with formula (2) below using lateral displacement $X_{front}$ of vehicle MM:

$$\phi_{front}=\tan^{-1}(dX'/V(=dX/dY)); \quad (2)$$

wherein dX is the amount of change per unit time in lateral displacement $X_{front}$;

dY is the amount of change in the forward direction per unit time; and dX' is the derivative of the amount of change dX.

Note that when yaw angle $\phi_{front}$ is calculated based on a nearby white line, there is no restriction that yaw angle $\phi_{front}$ be calculated using lateral displacement $X_{front}$ as in Formula (2) above. For example, a white line sensed nearby could be extended to a distance and yaw angle $\phi_{front}$ could be calculated based on the extended white line.

At step S50, the braking/drive force controller 8 calculates the mean yaw rate $\phi'_{path}$ based on Formula (3) below. Mean yaw rate $\phi'_{path}$ is the yaw rate required for vehicle MM to keep traveling along the travel path. Mean yaw rate $\phi'_{path}$ will be zero while a path straight ahead is being traveled. However, on a curved path, the mean yaw rate $\phi'_{path}$ changes according to the curvature $\beta_{front}$. Therefore, to calculate mean yaw rate $\phi'_{path}$, the curvature $\beta_{front}$ of the travel lane is used as follows:

$$\phi'_{path}=\beta_{front}\cdot V. \quad (3)$$

Here, for the mean yaw rate $\phi'_{path}$ to maintain the travel path, the average value $\phi'_{ave}$ of yaw rate $\phi'$ for a prescribed period may be used, or the value of a filter with a large time constant multiplied by yaw rate $\phi'$ could easily be calculated.

At step S60, braking/drive force controller 8 sets the forward fixed time Tt, which is related to a vehicle following distance as described herein.

Forward fixed time Tt is a predetermined time for determining a threshold value used to predict a condition in which the driver will come near a future obstacle SM. That is, forward fixed time Tt is used to determine a future position as described below. Forward fixed time Tt is set to 1 sec, for example.

Next, target yaw rates $\psi_{driver}$ and $\psi_{driverhosei}$ are calculated.

Target yaw rate $\psi_{driver}$ is calculated from steering angle δ and vehicle velocity V as in the formula below. Target yaw rate $\Psi_{driver}$ is a target yaw rate generated in response to steering as shown:

$$\psi_{driver}=Kv\cdot\delta\cdot V; \quad (4)$$

wherein

Kv is gain.

In addition, target yaw rate $\psi_{driverhosei}$ is calculated with the formula below. Target yaw rate $\psi_{driverhosei}$ is the value of mean yaw rate $\phi'_{path}$ required to travel the travel route subtracted from target yaw rate $\psi_{driver}$. This removes the effect of steering performed to travel a curved path as seen below:

$$\psi_{driverhosei} = \psi_{driver} - \phi'_{path}. \quad (5)$$

Next, at step S70, the braking/drive controller 8 calculates the predicted future vehicle position ΔXb in the lateral direction relative to the current travel path position when reaching the forward fixed time Tt based on Formula (6) below. The predicted future vehicle position ΔXb is also used to determine whether or not to allow the vehicle to leave the travel path and to change lanes. That is, the vehicle prediction position ΔXb as calculated below is used to determine whether to start the avoidance control for an obstacle SM:

$$\Delta Xb = (K1\phi + K2\phi m + K3\phi m'); \quad (6)$$

wherein

φ is the yaw angle;

φm is the target yaw angular speed; and

φm' is the target yaw angular acceleration.

Target yaw angular velocity φm uses the formula below:

$$\phi m = \psi_{driverhosei} \cdot Tt. \quad (7)$$

Additionally, target yaw angular acceleration φm' uses the formula below:

$$\phi m' = \phi m \cdot Tt^2. \quad (8)$$

Here, vehicle predicted position ΔXb can be represented using the formula below when forward fixed distance L is used to give the dimension of the yaw angle:

$$\Delta Xb = L \cdot (K1\phi + K2\phi m \cdot T + K3\phi m' \cdot Tt^2). \quad (9)$$

The relation between forward fixed distance L and forward fixed time Tt uses the formula below:

$$L = Tt \cdot V. \quad (10)$$

Based on such characteristics, the set gain K1 will be a value that uses the vehicle velocity V as a variable. Set gain K2 will be a value that uses the vehicle velocity V and the forward fixed time Tt as variables. The set gain K3 will be a value that uses the vehicle velocity V and the square of the forward fixed time (Tt²) as variables.

The predicted position of vehicle MM could also be calculated by finding the steering angle component and the steering speed component separately as in the formula below and selecting the maximum value as shown:

$$\Delta Xb = \max(K2\phi m, K3\phi m'). \quad (11)$$

Next, at step S80, the braking/drive force controller 8 sets a determination threshold value to start the control. The determination threshold value is used to determine whether to start the avoidance control for a side obstacle SM, and is analogous to the control start position (lateral position in the lane width direction) described above.

With this embodiment, obstacle distance X2obst shown in FIG. 4 is used as the determination threshold value. Obstacle distance X2obst is set assuming that an obstacle SM is present, and is set as a lateral distance from the position of the white line.

Here, an X-Y coordinate system is used, where the Y-axis is the direction along the travel path (longitudinal direction) and the X-axis is the direction perpendicular to the travel path, that is, the lane width direction (lateral direction). Obstacle distance X2obst is set on the X-axis coordinate. Note that obstacle distance X2obst will be 0 for a position where an imaginary object is present at the white line position, and becomes a positive value when on the outside of the white line with respect to vehicle MM and a negative value when inside of the white line with respect to vehicle MM.

Next, the method for setting the obstacle distance X2obst will be explained.

Figure 5:
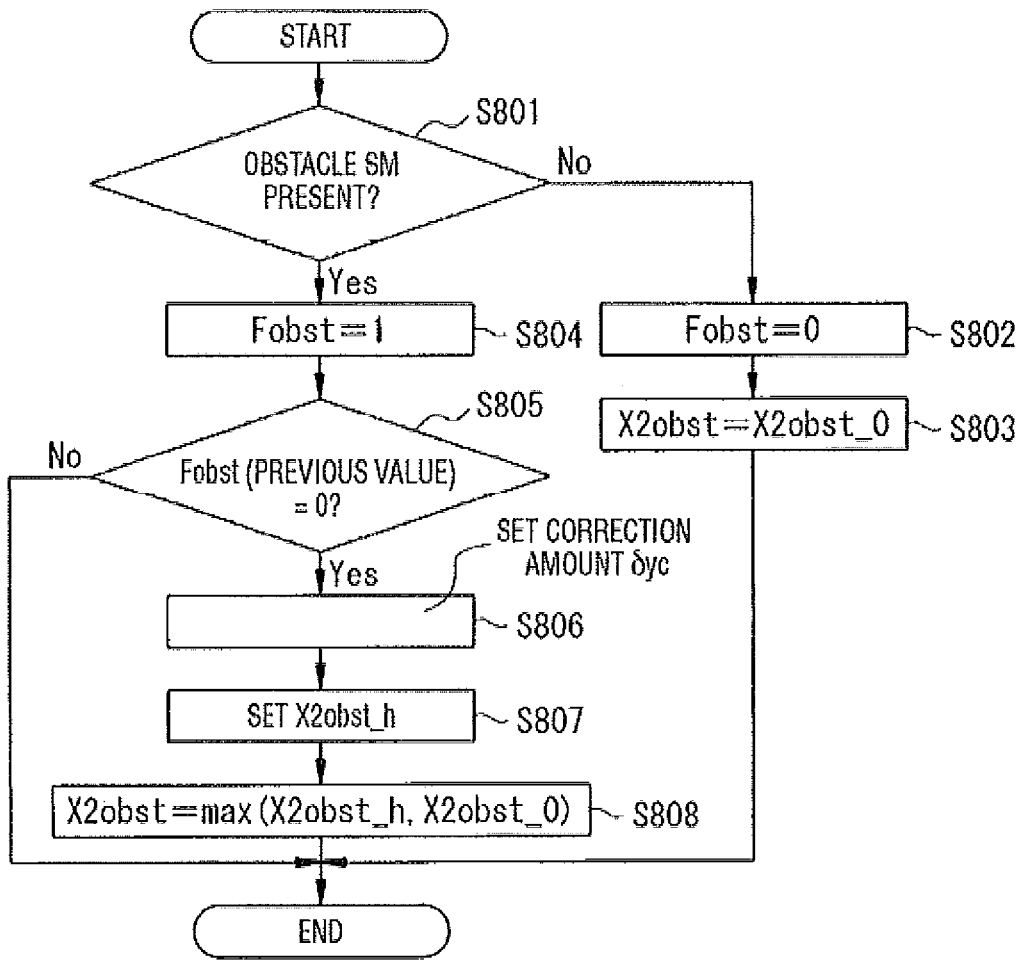
FIG. 5 is a flowchart showing the process for setting the control starting position.

FIG. 5 is a flowchart showing the process for setting the determination threshold value (control start position) at step S80.

First, at step S801, the braking/drive force controller 8 determines whether an obstacle (such as vehicle SM) is present in a preset area. The area may be the same as the obstacle sensing range described above, or the range may be broadened somewhat. The obstacle could also be determined to be present not only simply by its intersection with the preset area but also when the relative speed is considered and it is predicted that the obstacle will come into the preset area after a prescribed time.

If step S801 determines that no obstacle is present in the preset area, control passes to step S802, obstacle sensed flag Fobst is set to "0," and control passes to step S803.

At step S803, braking/drive force controller 8 sets obstacle distance X2obst and ends control start position setting processing. Here, reference obstacle distance X2obst_0, which is a preset value, is set as obstacle distance X2obst. With this embodiment, reference obstacle distance X2obst_0 is set to a prescribed distance on the inside of the white line. That is, the control start position is set to a position at a prescribed distance on the inside of the white line (i.e., inside the travel lane of the vehicle MM). Note that reference obstacle position X2obst_0 can be set to 0 (that is, the control start position can be set to the white line position), or it can be set to a prescribed distance toward the outside of the white line from the white line (that is, the control start position can be set to a prescribed lateral position in the next travel lane).

When step S801 determines that an obstacle is present in the preset area, control passes to step S804, obstacle sensed flag Fobst is set to "1," and control passes to step S805.

At step S805, braking/drive controller 8 determines whether obstacle sensed flag Fobst in the previous control cycle was "0." Then, if the previous obstacle sensed flag Fobst cycle was "0," it is determined that a state has occurred in which an obstacle has been sensed after not being sensed in the previous cycle, and control passes to step S806. On the other hand, if the previous obstacle sensed flag Fobst cycle was "1," a decision is made to maintain obstacle distance X2obst set in the previous control cycle, and the process for setting the control start position is ended without change.

At step S806, braking/drive controller 8 sets the correction amount δyc used for setting the corrected obstacle distance X2obst_h described below. Here, the correction amount δyc could also be used as a predetermined fixed value, or could be set by referencing a preset correction amount calculating map as described below.

Figure 6:
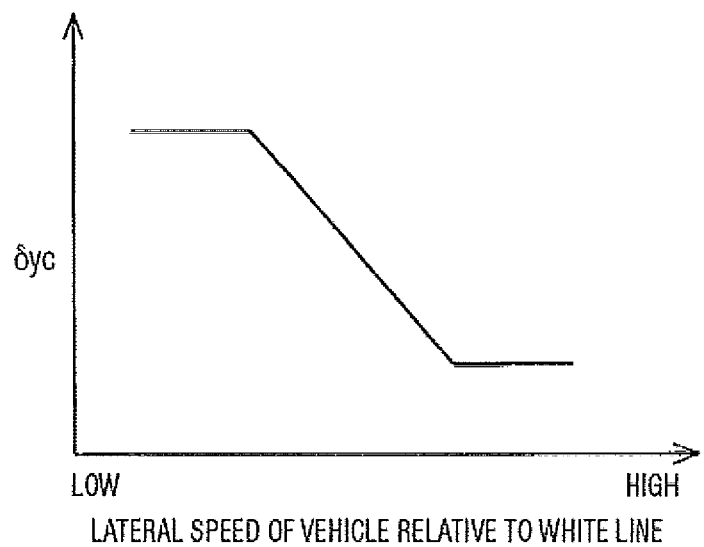
FIG. 6 is a map for calculating a correction amount.

The correction amount calculating map, as shown in FIG. 6, uses the correction amount δyc for the vertical axis and the lateral speed of the vehicle relative to the white line for the horizontal axis. Here, the faster the lateral speed is, the higher the possibility of a condition where an obstacle will be approached. Therefore, the correction amount δyc is set smaller.

Figure 7:
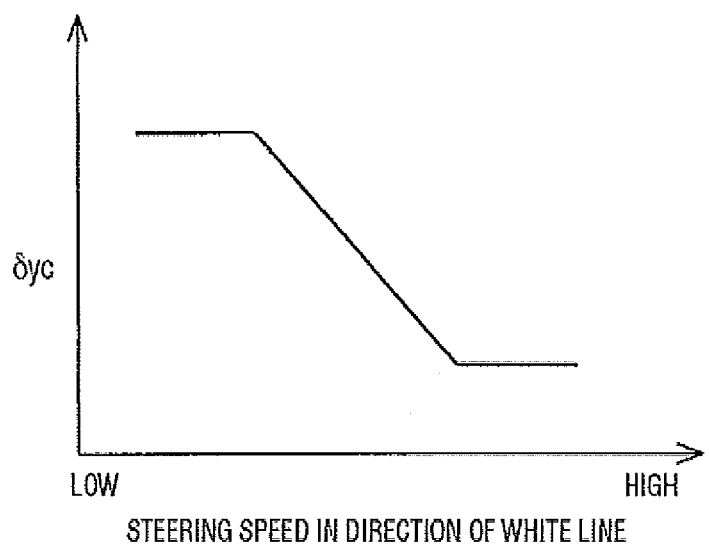
FIG. 7 is another example of a map for calculating a correction amount.

Note that, in lieu of the lateral speed of the vehicle relative to the white line, as shown in FIG. 7, the steering speed in the white line direction can also be used. In this case, the correction amount δyc is set smaller the faster the steering speed.

In addition, the amount of yaw rate change, lateral G amount of change, or other vehicle movement conditions can also be used to determine a condition where the vehicle is approaching an obstacle.

Figure 8:
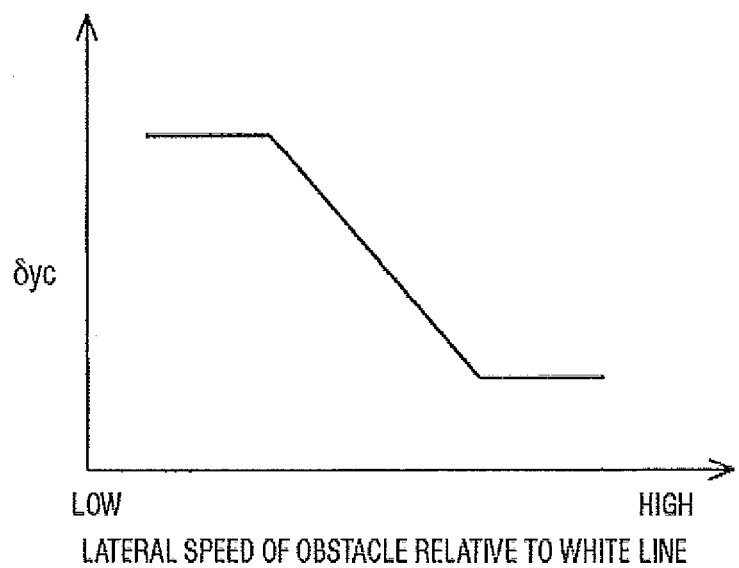
FIG. 8 is another example of a map for calculating a correction amount.

In lieu of the vehicle movement conditions, the correction amount δyc can also be set based on the obstacle movement conditions. For example, as shown in FIG. 8, the lateral speed of the obstacle relative to the white line is used, and the correction amount δyc is set smaller the faster the lateral speed. A condition where an obstacle will come close to the white line can be sensed through a combination of camera recognition and milliwave radar results (radar devices 24L/R), and this can also be sensed through the use of an image processing system that can simultaneously recognize a white line and an obstacle.

Figure 9:
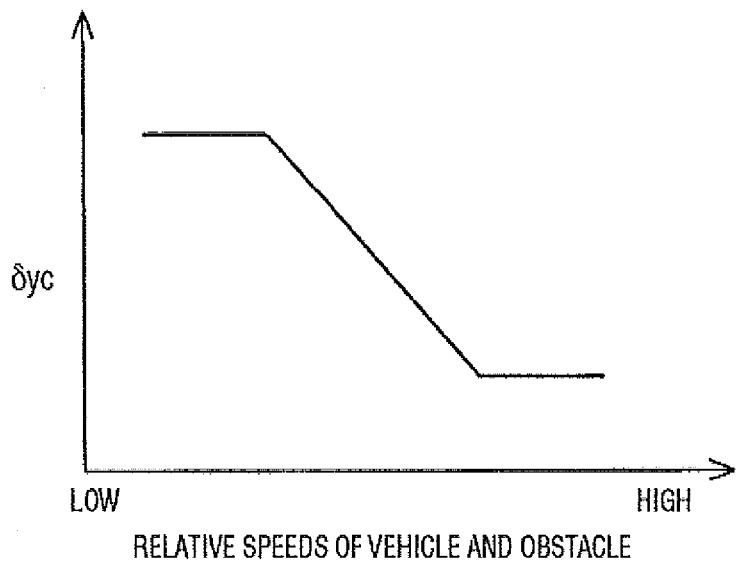
FIG. 9 is another example of a map for calculating a correction amount.

In addition, the correction amount δyc can also be set based on the relative movement conditions between the vehicle and an obstacle (a condition where vehicle and obstacle are near). For example, as shown in FIG. 9, the relative speed between the vehicle and the obstacle can be sensed, and the correction amount δyc can be set smaller the larger the relative speed.

Figure 10:
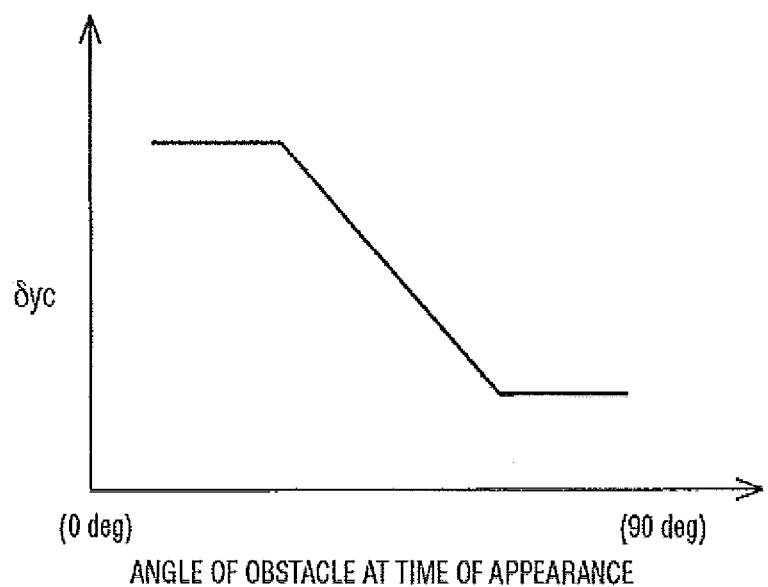
FIG. 10 is another example of a map for calculating a correction amount.

Additionally, as shown in FIG. 10, the correction amount δyc is set using the position of the obstacle (angle when the obstacle appears) relative to the vehicle when an obstacle is detected. The angle when the obstacle appears relative to the vehicle is measured from 0 degrees, where the angle is close to 0 degrees when the obstacle appears behind the vehicle, and is close 90 degrees when the obstacle appears directly beside the vehicle. The correction amount δyc is then set smaller the closer the angle is to 90 degrees when the obstacle appears.

Figure 11:
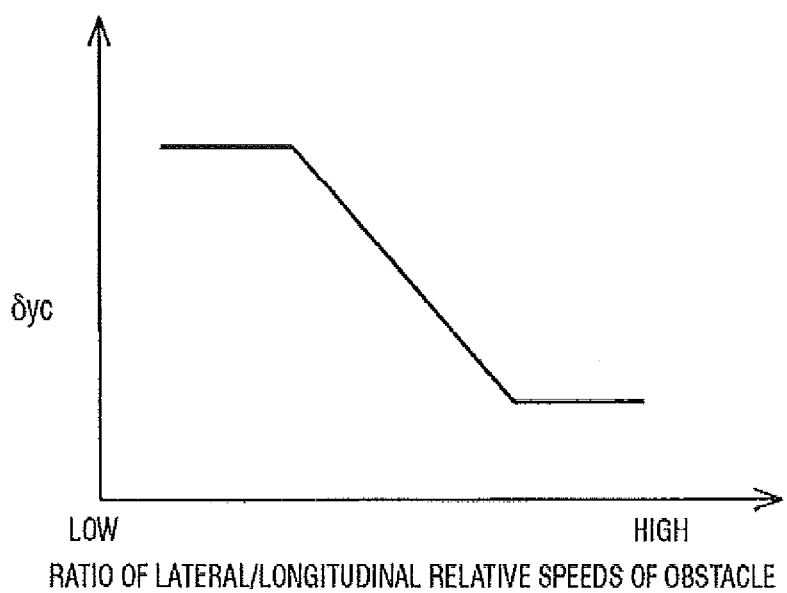
FIG. 11 is another example of a map for calculating a correction amount.

Additionally, as shown in FIG. 11, correction amount δyc can also be set using a ratio representing the relative lateral speed/relative longitudinal speed (lateral:longitudinal relative speed ratio) relative to the vehicle. In this case, the correction amount δyc is set smaller the larger the lateral:longitudinal relative speed ratio. The speed relative to the vehicle is calculated by deriving the distance between the vehicle and the obstacle sensed by the milliwave radar, or the distance is measured directly based on the frequency of the reflected waves that change according to the relative speed.

Next, at step S807, the braking/drive force controller 8 sets the corrected obstacle distance X2obst_h using the correction amount δyc set at step S806 above. Here, corrected obstacle distance X2obst_h is set to the lateral distance (δyc-X0) between the white line and a position on the outside of the travel lane that is the correction amount δyc from the vehicle.

Note that X0 is the lateral distance between the vehicle and the white line (distance in the lane width direction), and is acquired by processing of images photographed by the imaging unit 13. The lateral distance X0 between the vehicle and the white line will be a positive value when the vehicle is positioned on the inside of the white line and will be a negative value when the white line is passed.

Next, going to step S808, braking/drive force controller 8 sets obstacle distance X2obst based on corrected obstacle distance X2obst_h set at step S807 above and the preset reference obstacle position X2obst_0. Here, the corrected obstacle distance X2obst_h and reference obstacle distance X2obst_0 are compared, and the larger value is used as the obstacle distance X2obst as shown below:

$$X2obst = \max(X2obst\_h, X2obst\_0). \quad (12)$$

That is, between the position that is the corrected obstacle distance X2obst_h and the position that is the reference obstacle distance XS2obst_0, the position farther away from the vehicle is selected as the control start position. Thus when the distance of the vehicle from the white line is smaller than a prescribed distance |δyc+X2obst_0|, that is, when the vehicle is positioned closer to the lane edge than a prescribed lateral position at which the distance from the white line is |δyc+X2obst_0|, the obstacle distance X2obst is revised to corrected obstacle distance X2obst_h from reference obstacle distance X2obst_0.

Note that as the determination threshold value to start the control, in lieu of obstacle distance X2obst, the lateral relative distance ΔO between vehicle MM and obstacle SM can also be used (FIG. 4). Lateral relative distance ΔO is sensed by radar devices 24L/R. In this case, too, a corrected value ΔO_h can be provided and applied the same way as with the correction for X2obst described above.

It is also possible to use a predetermined threshold value Xthresh as the determination value to start the control. Threshold value Xthresh sets how far the future position of the vehicle is from the current vehicle position beforehand. In this case, too, a corrected value Xthresh_h can be provided and applied the same way as with the correction for X2obst described above.

Returning to FIG. 3, at step S90, the braking/drive controller 8 makes a decision to start the control.

Here, a decision to start the control is made when the formula below is satisfied:

$$\Delta X2 = \Delta Xb - X0 \geq X2obst. \quad (13)$$

That is, as shown in FIG. 4, it is determined whether lateral position ΔX2 between the white line and a future predicted position of vehicle MM is at least the obstacle distance X2obst. In other words, it is determined whether the future position of the vehicle will reach a control start position when a side obstacle is sensed.

If the conditions above are satisfied, a decision to start the control for obstacle SM is made assuming a lane change toward obstacle SM. When a decision to start the control for obstacle SM is made, the obstacle avoidance control decision flag Fout_obst is set to ON. On the other hand, when the conditions above are not satisfied, the obstacle avoidance control decision flag Fout_obst is set to OFF.

Note that when lateral relative distance ΔO between vehicle MM and obstacle SM is used as the determination threshold value to start the control, a decision to start the control is made when the formula below is satisfied:

$$\Delta Xb \geq \Delta O. \quad (14)$$

Additionally, when predetermined threshold value Xthresh is used as the determination threshold value to start the control, a decision to start the control is made when the formula below is satisfied:

$$\Delta Xb \geq Xthresh. \quad (15)$$

The vehicle predicted position ΔXb is found as ΔXbL/ΔXbR for the left side and the right side of the vehicle.

The obstacle SM that triggers the control could include not only a vehicle behind and to the side of vehicle MM but also an oncoming vehicle in front in an adjacent lane.

Here, when determining whether future predicted position ΔXb is less than a determination threshold value, one may also use a hysteresis in the amount of F so that ΔX2<X2obst−F. That is, a dead zone could also be set between the control intervention threshold value and the control end threshold value.

In addition, Fout_obst can be set ON when Fout_obst is OFF. As a condition when Fout_obst can be set ON, a time condition, such as after a prescribed time has elapsed after Fout_obst is set OFF, could also be added. In addition, Fout_obst=OFF could be set and control ended after Fout_obst=ON was determined and after a prescribed time Tcontrol has elapsed.

Additionally, in the implementation of obstacle avoidance control, the control implementation direction Dout_obst is determined according to the determined direction of the future predicted position. When the future predicted position is to the left, Dout_obst=LEFT is set, and when to the right, Dout_obst=RIGHT is set.

Here, when an anti-lock brake system (ABS), traction control system (TCS), or vehicle dynamic control system (VDC) is active, the obstacle avoidance control decision flag Fout_obst is set to OFF. This is so that the vehicle avoidance control is not activated during operation of the automatic braking control of these systems.

Note that such a determination method is synonymous with setting threshold values for yaw angle $\phi$, steering angle $\delta$, and steering speed $\delta'$ in the direction of obstacle SM, so that the control start timing determination will be less likely as the threshold values come closer to obstacle SM. This is because the target yaw rate $\phi m'$ is found according to the relationship with steering angle (vehicle velocity) as in formulas that are widely used.

Next, at step S100, the braking/drive force controller 8 performs processing to generate a warning.

Here, when it is determined that a control start position has been reached at step S90 above, a warning is generated.

Note that the warning could also be generated before the forward fixed point reaches a control start position based on the forward fixed time described above. For example, the time is multiplied by a prescribed gain Kbuzz (>1) to extend beyond forward fixed time Tt used for sensing at step S90 above. Then, (Tt·Kbuzz) is used, and a warning is generated when it is determined that the forward fixed point calculated based on Formula (6) above has reached a control start position at step S90 above.

A decision to start the operation of the obstacle avoidance system could also be made and a warning generated at step S90 above, and the control could be started after a prescribed time has elapsed following that warning.

Next, at step S110, the braking/drive force controller 8 sets the target yaw moment Ms.

When the obstacle avoidance control decision flag Fout_obst is OFF, the target yaw moment Ms is set to 0, and control passes to step S120.

On the other hand, when the obstacle avoidance control decision flag Fout_obst is ON, the target yaw moment Ms is calculated with the following formulas and control passes to step S120:

$$Ms = K1recv \cdot K2recv \cdot \Delta Xs; \text{ and}$$

$$\Delta Xs = (K1mon \cdot \phi + K2mon \cdot \phi m). \tag{16}$$

Figure 12:
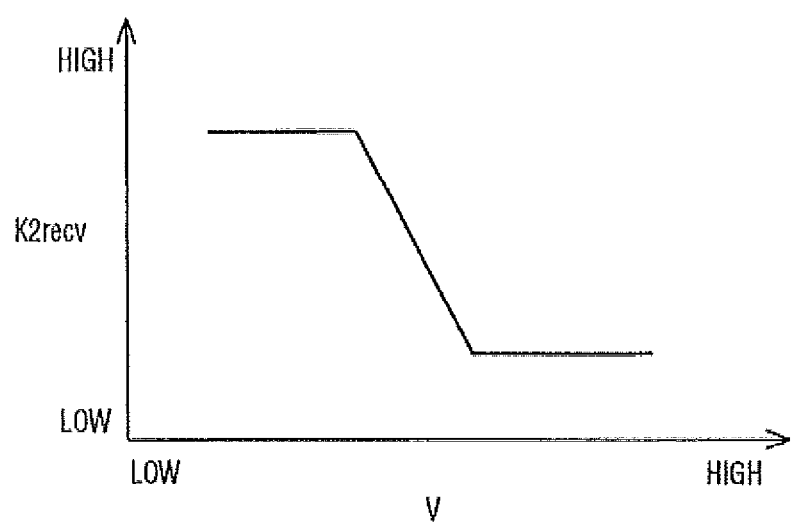
FIG. 12 is a graph showing the characteristics of gain K2recv.

Here, K1recv is the proportional gain (yaw inertial moment) determined from vehicle specifications. K2recv is a gain that fluctuates according to vehicle velocity V. An example of gain K2recv is shown in FIG. 12. As shown in FIG. 12, gain K2recv becomes larger within low-speed ranges, for example. When vehicle velocity V is at a certain value, gain K2recv has an inversely proportional relationship with vehicle velocity V. When a certain vehicle velocity V is reached after that, gain K2recv becomes a small, fixed value. The set gain K1mon is a value that uses the vehicle velocity V as a variable. The set gain K2mon is a value that uses the vehicle velocity V and forward fixed time Tt as variables.

With Formula (16) above, the target yaw moment Ms becomes larger with larger yaw rates generated steadily according to yaw angle $\phi$ relative to the white line and increased steering by the driver.

Alternatively, the target yaw moment Ms could also be calculated from Formula (17) below. Formula (17) is synonymous with Formula (16) above in that it is obtained by multiplying Formula (16) by a gain K3 (=1/Tt²). Gain K3 is a gain that decreases as forward fixed time Tt becomes larger.

$$Ms = K1recv \cdot \Delta Xb/(L \cdot Tt^2). \tag{17}$$

Formula (17) above indicates how to control the yaw angle by multiplying by how much control time T will be. Namely, by setting the control time T matched with forward fixed time Tt, when the forward fixed time Tt becomes shorter, the control time T to correct the vehicle becomes shorter. As a result, the amount of control is strengthened. Namely, even when the forward fixed time Tt will be shorter, the amount of control when control starts will be greater. In addition, if the forward fixed time Tt will be longer, the amount of control will be smaller. The result is that it is possible to implement control that will not cause much uneasiness in the driver in accordance with the conditions, independent of the setting of the forward fixed point.

Note that the setting of Fout_obst described above predicts a future path change based on steering information.

In a case where lane-exit prevention control is provided separately from the present control in order to generate a yaw moment in the vehicle toward the lane and to prevent it from leaving the lane where it is sensed that the vehicle is drifting out of the lane, depending on when the present control is activated and when the lane-exit prevention control is activated, one control may be given priority and be started first, and the other control would not be implemented until that control ends.

At step S120, the braking/drive controller 8 calculates an instruction to generate the target yaw moment Ms for obstacle avoidance, and after the output of this instruction, control returns to the initial processing.

Here, with this embodiment, an example where braking power is used to generate the yaw moment will be explained below as a means for generating a yaw moment Ms for obstacle avoidance.

Note that when a steering reaction control device is used as the means to generate the yaw moment, the reaction could be generated with steering reaction Frstr as Frstr=Ka·Ms. Note that Ka is a coefficient found by experimentation in advance to convert the yaw moment MS to the steering reaction.

When a steering control device is used as the means to generate the yaw moment, an effect is found with steering angle STRθ provided for steering where STRθ=Kb·Ms. Note that Kb is a coefficient found by experimentation in advance to convert the yaw moment MS to the steering angle.

Alternatively, the steering control device could be used as the means to generate the yaw moment through setting steering force (steering torque) as STRtrg=Kc·Ms. Note that Kc is a coefficient found by experimentation in advance to convert the yaw moment MS to the steering force.

When the target yaw moment Ms is 0, that is, when a resulting decision not to implement the yaw moment control is obtained, the brake fluid pressure Pmf and Pmr are set to the target brake fluid pressure Psi (i=fl, fr, rl, rr) for each wheel, as shown in Formula (18) and Formula (19) below:

$$Psfl = Psfr = Pmf; \tag{18}$$

and $$Psrl = Psrr = Pmr. \tag{19}$$

Here, Pmf is the brake fluid pressure for the front wheels. Pmr is the brake fluid pressure for the rear wheels and is a value calculated based on the front wheel brake fluid pressure Pmf, taking front-to-back distribution into consideration. For example, if the driver has operated the brakes, the brake fluid pressures Pmf and Pmr will be values corresponding to the amount of brake operation (master cylinder fluid pressure Pm).

On the other hand, when the absolute value of the target yaw moment Ms is greater than 0, that is, when a resulting decision to start obstacle avoidance control is obtained, processing as follows is performed.

Namely, the front wheel target brake fluid pressure difference ΔPsf and rear wheel target brake fluid pressure difference ΔPsr are calculated based on target yaw moment Ms. Specifically, target wheel target brake fluid pressure difference ΔPsf and ΔPsr are calculated with Formulas (20) and (21) below:

$$\Delta Psf = 2 \cdot Kbf \cdot (Ms \cdot FRratio)/T; \quad (20)$$

and $$\Delta Psr = 2 \cdot Kbr \cdot (Ms \times (1-FRratio))/T; \quad (21)$$

wherein
FRratio is a set threshold value;
T is tread; and
Kbf and Kbr are conversion coefficients for the front wheels and rear wheels when the braking force is converted to brake fluid pressure.

Note that tread T above is treated as the same value for the front and rear for the sake of convenience. Kbf and Kbr are determined according to brake specifications.

The braking force generated by the wheels is distributed in this way according to the magnitude of the target yaw moment Ms. Thus, the prescribed values are given for the target control brake fluid pressure differences ΔPsf and ΔPsr, and a braking force difference is generated between the front and rear left and right wheels. Then, the final target brake fluid pressure Psi (i=fl, fr, rl, rr) for each wheel is calculated using the calculated target brake fluid pressure differences ΔPsf and ΔPsr.

Specifically, when control implementation direction Dout_obst is LEFT, that is, to implement obstacle avoidance control for an obstacle SM to the left, target brake fluid pressure Psi (i=fl, fr, rl, rr) for each wheel is calculated with Formula (22) below:

$$Psfl = Pmf;$$

$$Psfr = Pmf + \Delta Psf;$$

$$Psrl = Pmr; \text{ and}$$

$$Psrr = Pmr + \Delta Psr. \quad (22)$$

In addition, when control implementation direction Dout_obst is RIGHT, that is, to implement obstacle avoidance control for an obstacle SM to the right, target brake fluid pressure Psi (i=fl, fr, rl, rr) for each wheel is calculated with Formula (23) below:

$$Psfl = Pmf + \Delta Psf;$$

$$Psfr = Pmf;$$

$$Psrl = Pmr + \Delta Psr; \text{ and}$$

$$Psrr = Pmr. \quad (23)$$

Based on Formula (22) and Formula (23) above, a braking force difference between the left and right wheels will be generated so that the braking force of the wheels on the obstacle avoidance side will be greater.

In addition, target brake fluid pressure Psi (i=fl, fr, rl, rr) for each wheel is calculated taking into account brake operation by the driver, that is, brake fluid pressures Pmf an Pmr, as illustrated with Formula (22) and Formula (23) here.

Then braking/drive force controller 8 uses target brake fluid pressure Psi (i=fl, fr, rl, rr) for each wheel calculated in this way as desired brake fluid pressure values and outputs them to brake fluid pressure controller 7.

The operation of a first embodiment will be explained next.

Here, it is assumed that the vehicle is traveling in the center of a vehicle travel lane. In this instance, the vehicle predicted position ΔXb is calculated (step S70 in FIG. 3) as the future position of the vehicle after the forward fixed time Tt based on yaw angle φ, yaw angular velocity φm, etc., which indicate the traveling state of the vehicle.

Next, the determination position (control start position) for starting the control to prevent the vehicle from coming too close to an obstacle on one of the sides is set. In this instance, the control start position (obstacle distance X2obst) corresponds to the vehicle position at the point in time when a state in which an obstacle to the side of the vehicle is sensed after a state in which no vehicle is sensed (step S80).

Figure 13:
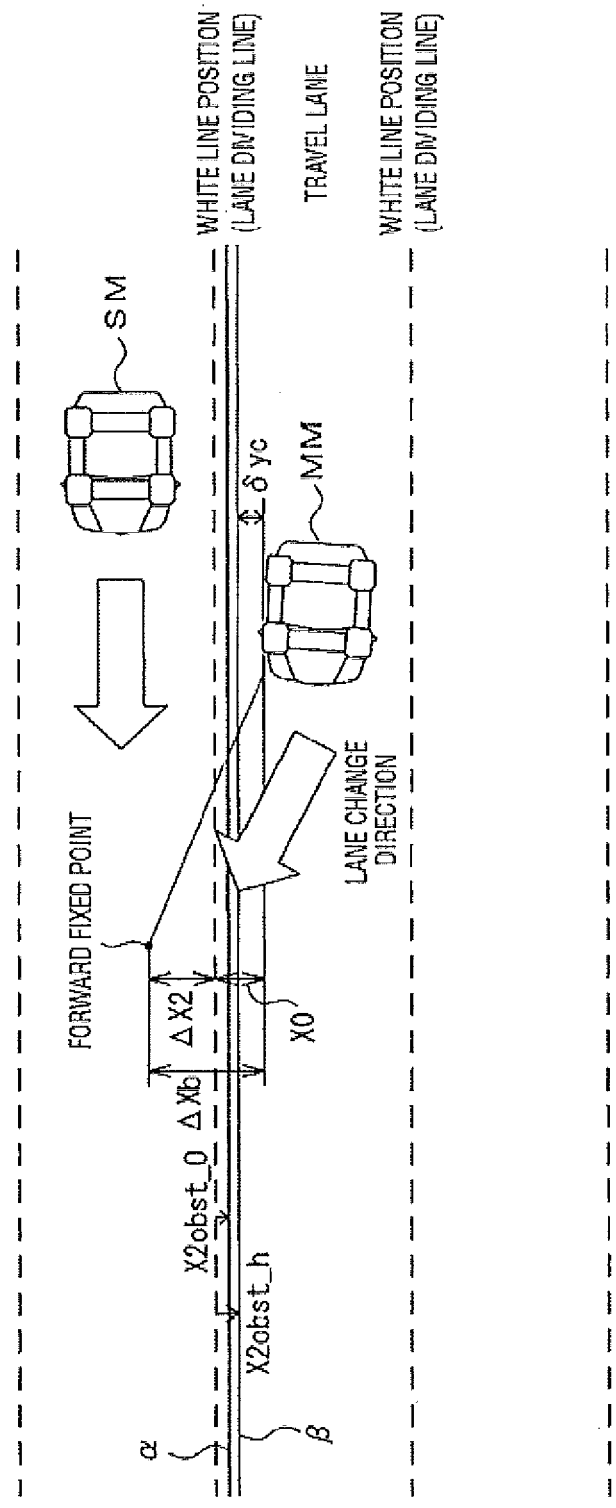
FIG. 13 is a pictorial representation of a vehicle having an inventive driving support system for illustrating the operation of the first embodiment.

Here, as shown in FIG. 13, the control start position α (position of reference obstacle distance X2obst_0 from the white line) is set in advance. In this instance, it is assumed that the vehicle MM is traveling in the center of the travel lane, and that the control start position β on the outside by δyc from the vehicle position is positioned closer to the center of the travel lane than control start threshold value α. That is, the corrected obstacle distance X2obst_h is assumed to be smaller than the reference obstacle distance X2obst_0. In this case, as indicated by the thick line in the figure, the control start threshold value α will be the ultimate control start threshold value, and the reference obstacle distance X2obst_0 is set as obstacle distance X2obst.

Then, when vehicle MM moves toward obstacle (adjacent vehicle) SM and ΔXb≥X2obst (=X2obst_0)+X0, the support control for obstacle avoidance is started (step S90). That is, there is a decision to start the control when the vehicle predicted position ΔXb, which is the future position of the vehicle when an adjacent vehicle SM is sensed, reaches the lateral position in the lane width direction at which the distance from the white line is (X2obst+X0).

With a decision to start the control, the target yaw moment Ms is calculated based on the vehicle predicted position ΔXb (step S110), and braking power is controlled so that the target yaw moment Ms will be generated (step S120). Vehicle MM is controlled in a direction to prevent it coming too close to adjacent vehicle SM.

Figure 14:
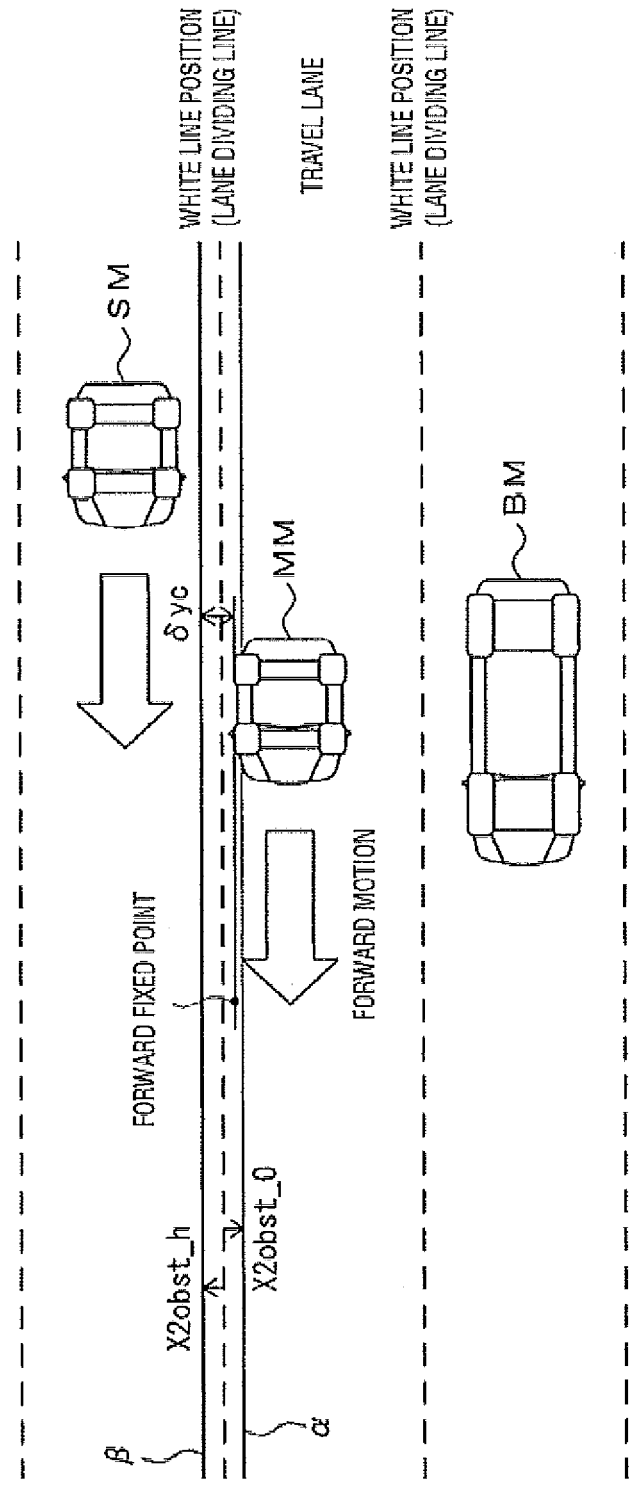
FIG. 14 is a pictorial representation of a vehicle having an inventive driving support system for illustrating the operation of the first embodiment.

On the other hand, as shown in FIG. 14, assume that vehicle MM avoids a large vehicle BM traveling in an adjacent lane and moves closer to the white line on the opposite side away from said large vehicle BM. Subsequently, a state occurs in which the adjacent vehicle SM is sensed in the adjacent lane on the opposite side from where large vehicle BM is traveling after not being previously sensed.

In this case, the control start position β positioned on the outside by δyc from the vehicle position will be positioned closer to the outside of the lane than control start position α. That is, the corrected obstacle distance X2obst_h will be larger than the reference obstacle distance X2obst_0. For this reason, as indicated by the thick line in the figure, the control start position β will be the ultimate control start position, and the corrected obstacle distance X2obst_h is set as the obstacle distance X2obst. That is, if a state occurs in which the adjacent vehicle SM is sensed after not being sensed, when the position of the vehicle in the lane width direction is closer to the outside of the lane than the δyc position (prescribed lateral position) toward the inside of the lane from the control start position α, control start position α is additionally corrected to control start position β toward the outside in the lane width direction (that is, toward the obstacle).

In this instance, when the vehicle MM is traveling straight ahead, ΔXb<X2obst (=X2obst_h)+X0. Therefore, in this case, the control for obstacle avoidance is not active.

In the case of a conventional system that does not correct the control start threshold value such as in this embodiment, at the stage shown in FIG. 14, the reference obstacle distance X2obst_0 will be set as the obstacle distance X2obst, regardless of the vehicle position. For this reason, when the vehicle MM avoids the large vehicle BM as shown in FIG. 14 and the driver intentionally moves the vehicle closer to the white line (toward the white line from a prescribed lateral position by δyc from control start position α), even when going straight ahead, the possibility of ΔXb≥X2obst (=X2obst_0)+X0 occurring is high, and the possibility of starting the control for obstacle avoidance is high. That is, the possibility of vehicle MM being controlled in a direction closer to the large vehicle BM is high. When the control intervenes in such a situation, the driver will feel uneasy.

In contrast, with this embodiment, if a state occurs in which the adjacent vehicle SM is sensed after not being sensed, when the vehicle MM is traveling closer to the adjacent vehicle SM than a prescribed position (position toward the inside of the lane by δyc from control start position α), the obstacle distance X2obst=X2obst_h.

That is, when the vehicle MM is traveling closer to the inside of the lane than a prescribed lateral position, the control start position α is set using the obstacle distance X2obst used as the reference obstacle distance X2obst_0. Then, if the vehicle MM travels closer to the outside of the lane than the prescribed lateral position, the control start position is corrected more to the outside in the lane width direction than the control start position α (toward the obstacle) using the obstacle distance X2obst as the corrected obstacle distance X2obst_h. That is, control is less likely to be started (it is suppressed) when the vehicle travels closer to the outside of the lane than the prescribed lateral position than when it is traveling closer to the inside of the lane.

By suppressing the start of the control in this way, a sense of uneasiness in the driver can be reduced.

In addition, by setting the corrected obstacle distance X2obst_h according to vehicle movement conditions or obstacle movement conditions, or the relative movement conditions of the vehicle and the obstacle, the amount of suppression used to decide to start the control will be adjusted. Because of this, a decision to start the control can be made so as to reduce the feeling of uneasiness in the driver.

Note that in the first embodiment above, the position toward the outside of the travel lane by correction amount δyc relative to the vehicle lateral position was set as control start position β, but it is preferable that the control start position β be updated after the initial setting only when the vehicle moves toward the inside of the lane and not when the vehicle moves toward the outside of the lane. That is, it is preferable that the control start position β be updated after the initial setting in a direction toward the inside of the lane and not be updated in a direction toward the outside of the lane accompanying movement of the vehicle in the lane width direction.

The effects of the first embodiment are described below.

(1) The side obstacle sensing means (in this example, radar devices 24L/R) senses obstacles on one of the sides of the vehicle. The future position predictor predicts the future position of the vehicle after a preset time. The vehicle control means controls the vehicle by imparting a yaw moment to the vehicle in a direction to avoid it coming too close to an obstacle sensed by the side obstacle sensing means when a future position of the vehicle predicted by the future position predictor is at a position closer to the obstacle in the lane width direction than the control start position, which is a prescribed lateral position in the lane width direction.

In addition, when an obstacle is first sensed, the vehicle control means compares when the vehicle travel position is closer to the edge of the lane than the center of the travel lane in which the vehicle is traveling and is in a position closer to an obstacle in the lane width direction than a prescribed lateral position closer to the center of the travel lane than the control start position, and when the vehicle is traveling closer to the opposite side from said obstacle than a prescribed lateral position.

In this way, the control of imparting a yaw moment to the vehicle in a direction to avoid coming too close to an obstacle is adjusted according to the vehicle position within the lane when a state occurs in which an obstacle is sensed after not being sensed. For this reason, when the vehicle is intentionally traveling toward an obstacle when the obstacle has not been sensed, the control can be suppressed even when the obstacle is sensed.

Therefore, the control for side obstacles can be accomplished as appropriate while suppressing any control that could cause the driver to feel uneasy.

(2) The control start determiner decides to start control by the vehicle control means when a future lateral position of the vehicle is at a position closer to an obstacle in the lane width direction than a control start position. In addition, the control start determiner suppresses the control by the vehicle control means for imparting a yaw moment to the vehicle by suppressing the decision to start the control.

Therefore, when the vehicle is intentionally traveling toward an obstacle when the obstacle has not been sensed, the control can be suppressed even when the obstacle is sensed.

(3) The control start determiner suppresses the decision to start the control by changing the control start position to be closer to the obstacle in the lane width direction.

The decision to start control can be suppressed relatively easily by this adjustment.

(4) The control start is set to a position at a prescribed distance in the lane width direction from the position of the lane dividing line on the side close to the obstacle. That is, the control start position is set to a prescribed distance X2obst from the lane dividing line (white line), and a decision to start the control is made by whether or not an estimated future position ΔX2 from the white line will reach the control start position.

Therefore, a decision to start the control can be suppressed relatively easily by adjusting the prescribed distance X2obst.

(5) The control start position is set based on the distance, in the lane width direction, between the vehicle and an obstacle. That is, a decision to start control is made according to whether the vehicle future predicted position ΔXb will reach a distance ΔO between the vehicle and a sensed obstacle.

Therefore, a decision to start the control can be suppressed relatively easily by adjusting the distance ΔO between the vehicle and the obstacle.

(6) The control start determiner suppresses a decision to start the control according to how low the possibility is that the vehicle movement conditions will bring it closer to an obstacle, when a state occurs in which an obstacle is sensed by the side obstacle sensing means after not being sensed.

In this way, when the vehicle is moving in a direction closer to an obstacle, the amount of change in the lateral position in the lane width direction toward the obstacle will be made smaller. Therefore, the suppression of the start of the obstacle avoidance control will be prevented when a state occurs in which an obstacle is sensed after not being sensed when the vehicle changes lanes from time to time. The result is that the control for avoiding side obstacles can be performed appropriately.

(7) The control start determiner suppresses a decision to start the control according to how low the possibility is that the obstacle movement conditions will bring it near to the vehicle, when a state occurs in which an obstacle is sensed by the side obstacle sensing means after not being sensed.

In this way, when an obstacle is moving in a direction closer to the vehicle, the amount of change in the lateral position in the lane width direction toward the obstacle will be made smaller. Therefore, the control for avoiding side obstacles can be performed appropriately.

(8) The control start determiner suppresses a decision to start the control according to how low the possibility is that the relative movement conditions of the vehicle and the obstacle will bring the two close to each other, when a state occurs in which an obstacle is sensed by the side obstacle sensing means after not being sensed.

In this way, when the vehicle and an obstacle are close to each other, the amount of change in the lateral position in the lane width direction toward the obstacle will be made smaller. Therefore, the control for avoiding side obstacles can be performed appropriately.

(9) When an obstacle to the side of the vehicle is sensed, the future position of the vehicle after a prescribed time is predicted. When the predicted vehicle future position is at a position closer to the obstacle, in the lane width direction, than the control start position, which is a prescribed lateral position in the lane width direction, the vehicle is controlled so that a yaw moment to prevent coming too close to the obstacle is imparted to the vehicle. When a state occurs in which an obstacle is sensed by the side obstacle sensing means after not being sensed (that is, an obstacle is first detected, the control to impart the yaw moment to the vehicle is suppressed by comparing when the vehicle travel position is more to the edge of the lane than the center of the travel lane in which the vehicle is traveling and is in a position closer to an obstacle in the lane width direction than a prescribed lateral position closer to the center of the travel lane than the control start position, and when the vehicle is traveling closer to the opposite side from the obstacle than a prescribed lateral position.

Therefore, coming too close to an obstacle can be prevented appropriately while suppressing any control that could cause a sense of uneasiness in the driver.

Second Embodiment

A second embodiment of the present invention is next explained that suppresses start of the control by adjusting the forward fixed time Tt, in contrast to suppressing the start of control by adjusting the control start position as in the first embodiment described above.

The basic configuration of the second embodiment is the same as the first embodiment described above.

Figure 15:
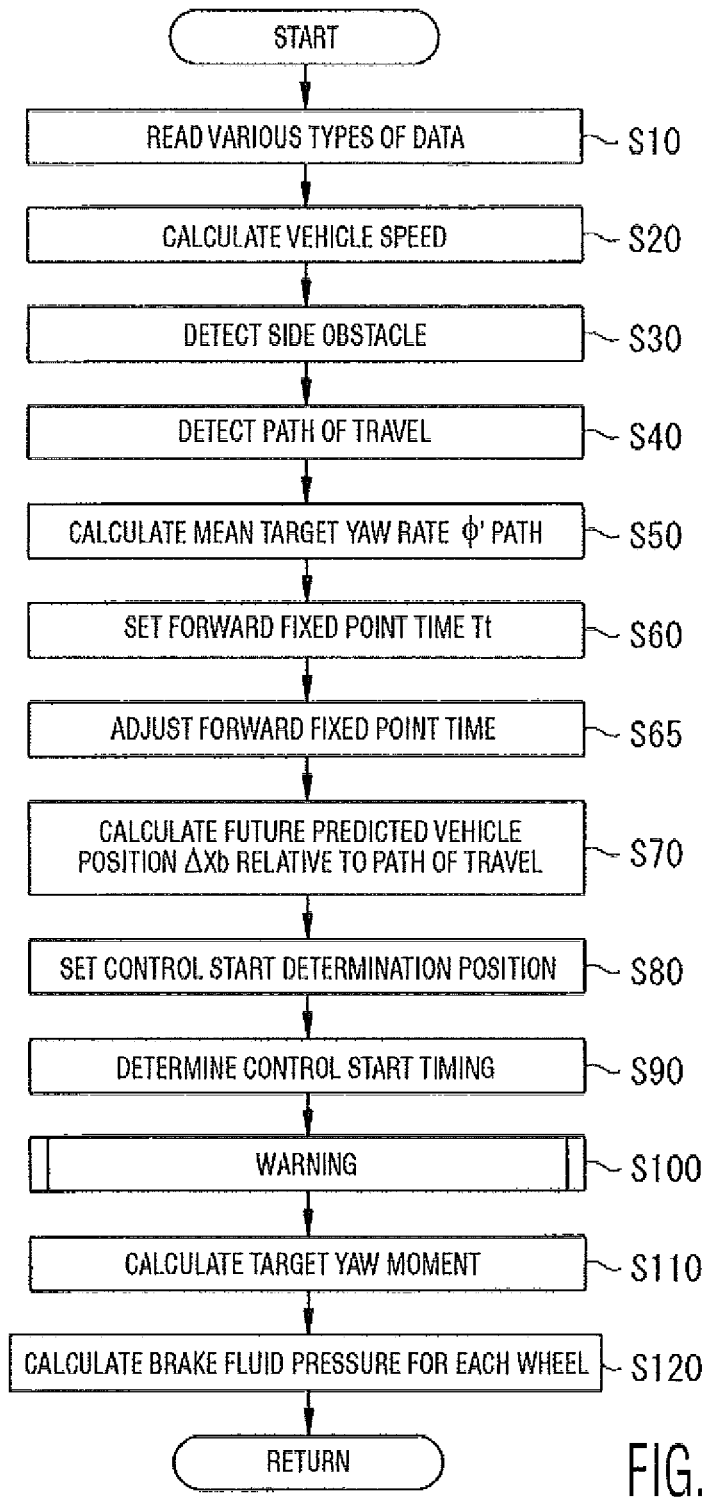
FIG. 15 is a flowchart showing the processing procedure by the controller in a second embodiment.

FIG. 15 is a flowchart showing the obstacle avoidance control processing procedure executed by the braking/drive force controller 8 in the second embodiment.

This obstacle avoidance control processing is the same as the obstacle avoidance processing in FIG. 3, except that the processing in step S65 is added and the processing in step S80 is different. The portions of the processing that are different will primarily be explained here.

At step S65, the braking/drive force controller 8 adjusts the forward fixed time Tt.

The following processing occurs when an obstacle is first sensed at present in a preset area after not being sensed. When the lateral position of the vehicle is a position closer to the outside of the lane than a prescribed lateral position in the lane width direction by a prescribed distance relative to the control start position (a distance beyond the center of the lane of 50 cm for example), forward fixed time Tt, which was set at step S60 above, is adjusted based on the formula below. On the other hand, when the lateral position of the vehicle is closer to the inside of the lane than the prescribed lateral position, the forward fixed time Tt is not adjusted. That is, if the vehicle is outside the control start threshold when the obstacle is first detected, the time Tt is adjusted to shorten the future position prediction according to the formula below. Otherwise, if the vehicle is inside the control start threshold when the obstacle is first detected, time Tt is not adjusted:

$$Tt \leftarrow Tt \cdot Kt. \quad (24)$$

Note that Kt is a gain, and $Kt \leq 1$. As a result, if a state occurs in which an obstacle is sensed after not being sensed, when the lateral position of the vehicle is a position closer to the outside of the lane than the prescribed lateral position, and the possibility that obstacle avoidance control will be started is high, the forward fixed time Tt is shortened.

Note that the gain Kt is set so that the forward fixed time Tt will become shorter the higher the possibility of the vehicle and an obstacle becoming close, according to vehicle movement conditions or obstacle movement conditions, the same as the setting of correction amount δyc in the first embodiment described above.

In addition, if a state occurs in which an obstacle is sensed after not being sensed, when the lateral position of the vehicle is a position closer to the inside of the lane than a prescribed lateral position, even when the forward fixed time Tt is corrected (even when the forward fixed time Tt remains as set at step S60), when the possibility that obstacle avoidance control will be started is high, the forward fixed time Tt will remain as forward fixed time Tt set at step S60 (Kt=1).

Figure 16:
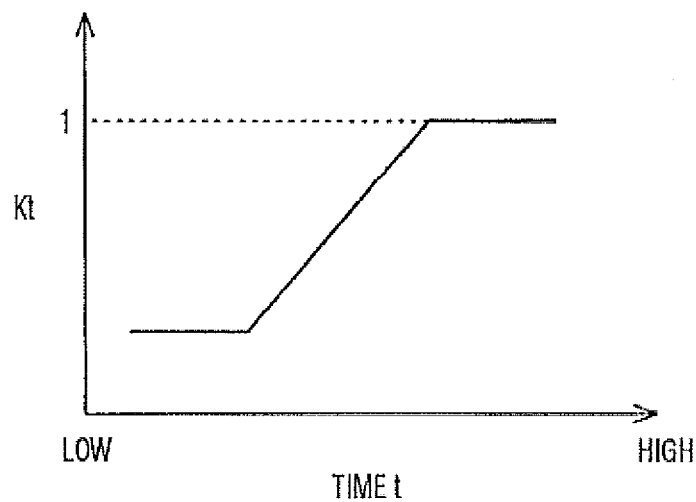
FIG. 16 is a map for calculating a gain according to time.

Note that gain Kt can also be set by referencing the gain calculating map shown in FIG. 16. This gain calculating map uses gain Kt for the vertical axis, and the elapsed time t from the time when a state occurs in which an obstacle is sensed as present in a preset area after not being present is used for the horizontal axis. Then, when a state occurs in which an obstacle is present in the preset area after not being present, the gain Kt is the minimum value and increases toward 1 as time passes. That is, the forward fixed time Tt will be shortest when a state occurs in which an obstacle is present in a preset area after not being present, and the forward fixed time Tt will approach the forward fixed time Tt set at step S60 above as time passes.

When no obstacle is present in the preset area, gain Kt=1.

At step S80, the braking/drive controller 8 sets a control start position based on a preset obstacle distance X2obst (that is, reference obstacle distance X2obst_0 in the first embodiment). Note that the relative distance ΔO in the lateral direction between vehicle MM and obstacle SM could also be used as obstacle distance X2obst.

The operation of the second embodiment will be explained next.

Here, the vehicle is assumed to be traveling near the white line, and it is assumed that a state occurs in which a vehicle traveling in a lane adjacent to the vehicle travel lane is first sensed as the obstacle to the side of the vehicle.

First, the forward fixed time Tt for calculating the vehicle prediction position ΔXb, which is the future position of the vehicle, is set. In this instance, because the vehicle is traveling near the white line (closer to the outside of the line relative to a prescribed lateral position toward the inside of the lane by a predetermined prescribed distance relative to the control start position), the forward fixed time Tt is a shorter time than when no adjacent vehicle is sensed (step S65). Next, the vehicle predicted position ΔXb is calculated as the future position of the vehicle after the forward fixed time Tt, based on yaw angle φ, yaw angular velocity φm, etc., which are the travel conditions of the vehicle (step S70).

Then, the control for obstacle avoidance is started when the lateral distance ΔX2 between the white line and the vehicle predicted position ΔXb on the side where the obstacle (adjacent vehicle) SM was sensed reaches at least the preset obstacle distance X2obst (when the lateral position of the vehicle after forward fixed time Tt is more to the outside in the lane width direction than the control start position) (step S90). Here, because the forward fixed time Tt is adjusted to a smaller value (i.e., it shortens), the start of control is suppressed compared to before the correction of the forward fixed time Tt.

Therefore, when the vehicle is intentionally traveling near the white line and a state occurs in which an obstacle to the side is sensed after not being sensed, a decision to start control is suppressed and the feeling of uneasiness in the driver can be reduced.

Vehicle predicted position ΔXb will also be smaller due to the forward fixed time Tt being shortened. For this reason, even when the control is started, the control amount (target yaw moment Ms) will be smaller when the target yaw moment Ms is calculated using Formula (16) above. Therefore, this suppresses fluctuation in vehicle behavior during control interrupts.

On the other hand, when the target yaw moment Ms is calculated with Formula (17) above, the amount of control will be large, even when the vehicle predicted position ΔXb is small.

This embodiment has the following effect.

(10) The control start determiner suppresses the decision to start the control by shortening the prescribed time when the future position of the vehicle is predicted by the future position predictor.

Because of this, the decision to start the control can be suppressed relatively easily.

In each of the embodiments above, the control start timing is adjusted by adjusting the obstacle distance X2obst or another determination threshold value, or the forward fixed time Tt. In lieu of this, the control start timing can also be delayed by multiplying the vehicle predicted position ΔXb calculated at step S70 by an adjustment gain (<1). In this case, too, the same effects as each of the embodiments above will be obtained.

The control start timing could also be adjusted by multiplying ΔXb, in the control start timing determination conditions at step S90, by such an adjustment gain. In this case, even when the control start timing is adjusted with the adjustment gain, the control amount (target yaw moment Ms) during control operation will not be affected by the adjustment gain.

In each of the embodiments above, a decision to start the control can also be suppressed so that the control is not activated (e.g., the control is canceled) when a state occurs in which an obstacle to the side is sensed after not being sensed and the vehicle is traveling toward the obstacle from a prescribed lateral position. With this process, unnecessary control operations can be prevented, even when the vehicle is traveling toward the white line when a state occurs in which an obstacle is sensed after not being sensed. The result is that the sense of uneasiness in the driver can be reduced. Note that in this case, if necessary, the system could activate just a warning.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A driving support device for a vehicle traveling on a road with travel lanes, comprising:
    a side obstacle detection device for detecting a presence of an obstacle on a side of the vehicle;
    a future position predictor that predicts a future position of the vehicle after a prescribed time starting from when the obstacle is detected by the side obstacle detection device; and
    a controller configured to perform the following control:
        set a control start position in a lane width direction;
        set a prescribed lateral position between the control start position and a center of a travel lane of the vehicle; and
        when the obstacle is detected by the side obstacle detection device in a detection cycle subsequent to a detection cycle in which no obstacle is detected, for a given position of the obstacle, selectively apply a yaw moment to the vehicle in a direction to prevent the vehicle from approaching the obstacle based on a current lateral position of the vehicle with respect to the prescribed lateral position, wherein the yaw moment is applied if the current lateral position of the vehicle is between the center of the travel lane and the prescribed lateral position and the future position of the vehicle is closer to the obstacle in the lane width direction than the control start position, and is suppressed if the current lateral position of the vehicle is closer to the obstacle than the prescribed lateral position.

2. The driving support device of claim 1, wherein the controller further comprises:
    a control start decision device configured to decide when to start to apply the yaw moment to the vehicle after the obstacle is detected by the side obstacle detection device; wherein the controller is configured to suppress application of the yaw moment to the vehicle by suppressing a decision by the control start decision device to start to apply the yaw moment to the vehicle.

3. The driving support device of claim 2, wherein the controller is configured to suppress the decision to start to apply the yaw moment to the vehicle by adjusting the control start position to be closer to the obstacle.

4. The driving support device of claim 2, wherein the controller is configured to suppress the decision to start to apply the yaw moment to the vehicle according to a possibility that movement conditions of the vehicle will cause the vehicle to contact the obstacle.

5. The driving support device of claim 2, wherein the controller is configured to suppress the decision to start to apply the yaw moment to the vehicle according to a possibility that movement conditions of the obstacle will cause the vehicle to contact the obstacle.

6. The driving support device of claim 2, wherein the controller is configured to suppress the decision to start to apply the yaw moment to the vehicle according to a possibility that relative movement conditions of the vehicle and the obstacle will cause the vehicle to contact the obstacle.

7. The driving support device of claim 1, further comprising:
a lane detection device for detecting a lane dividing line adjacent to the vehicle; wherein the controller is configured to set the control start position to a position within a travel lane of the vehicle in the lane width direction that is a prescribed distance from the lane dividing line.

8. The driving support device of claim 1, wherein the controller is configured to set the control start position based on a distance between the vehicle and the obstacle in the lane width direction.

9. The driving support device of claim 1, wherein the controller is configured to suppress the decision to start to apply the yaw moment to the vehicle by decreasing the prescribed time.

10. A driving support device for a vehicle traveling on a road with travel lanes, comprising:
a side obstacle sensing means for sensing an obstacle on a side of the vehicle;
future position prediction means for predicting a future position of a vehicle after a prescribed time starting from when the obstacle is detected;
means for setting a control start position in a lane width direction;
means for comparing the future position of the vehicle to the control start position;
means for setting a prescribed lateral position between the control start position and a center position of a travel lane in which the vehicle is traveling;
and
means, when the obstacle is sensed by the side obstacle sensing means in a detection cycle subsequent to a detection cycle in which no obstacle is detected, and for a given position of the obstacle, for selectively applying a yaw moment to the vehicle in a direction to prevent the vehicle from approaching the obstacle based on a current lateral travel position of the vehicle with respect to the prescribed lateral position, wherein the yaw moment is applied if the current lateral travel position of the vehicle is between the center position of a travel lane and the prescribed lateral position and the future position of the vehicle is closer to the obstacle in the lane width direction than the control start position, and is suppressed if the current lateral travel position of the vehicle is closer to the obstacle than the prescribed lateral position.

11. A driving support method for a vehicle traveling on a road with travel lanes, comprising:
sensing, with a side obstacle detection device, an obstacle on one side of the vehicle;
predicting, with a future position predictor, a future position of the vehicle after a prescribed time starting from when the obstacle is detected; and
using at least one processor to:
set a control start position in a lane width direction,
compare the future position of the vehicle to the control start position,
set a prescribed lateral position between the control start position and a center position of a travel lane in which the vehicle is traveling,
and
when the obstacle is sensed in a detection cycle subsequent to a detection cycle in which no obstacle is detected, for a given position of the obstacle, selectively apply a yaw moment to the vehicle in a direction to prevent the vehicle from approaching the obstacle based on a current lateral travel position of the vehicle with respect to the prescribed lateral position, wherein the yaw moment is applied if the current lateral travel position of the vehicle is between the center position of the travel lane and the prescribed lateral position and the future position of the vehicle is closer to the obstacle in the lane width direction than the control start position, and is suppressed if the current lateral travel position of the vehicle is closer to the obstacle in the lane width direction than the prescribed lateral position.

12. The driving support method of claim 11, wherein suppressing application of the yaw moment to the vehicle comprises suppressing a decision to apply the yaw moment to the vehicle.

13. The driving support method of claim 12, wherein suppressing the decision to apply the yaw moment to the vehicle comprises adjusting the control start threshold position to be closer to the obstacle.

14. The driving support method of claim 12, wherein setting the control start position comprises setting the control start position based on a prescribed time; and wherein suppressing a decision to apply the yaw moment to the vehicle comprises decreasing the prescribed time used to set the control start position.

15. The driving support method of claim 11, further comprising:
detecting a lane dividing line adjacent to the vehicle; wherein setting the control start position comprises setting the control start position to a position within the travel lane of the vehicle in the lane width direction that is a prescribed distance from the lane dividing line.

16. The driving support method of claim 11, wherein setting the control start position comprises setting the control start position based on a distance between the vehicle and the obstacle in the lane width direction.

* * * * *